(12) United States Patent
Belelie et al.

(10) Patent No.: US 7,578,587 B2
(45) Date of Patent: Aug. 25, 2009

(54) CURABLE OVERCOAT FOR WAX-BASED INKS

(75) Inventors: Jennifer L. Belelie, Oakville (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 374 days.

(21) Appl. No.: 11/289,552

(22) Filed: Nov. 30, 2005

(65) Prior Publication Data

US 2007/0120922 A1    May 31, 2007

(51) Int. Cl.
  *B41J 2/01* (2006.01)
(52) U.S. Cl. .................. 347/105; 347/101; 347/100; 428/32.1
(58) Field of Classification Search .......... 347/101, 347/105, 100; 428/195, 32.1
  See application file for complete search history.

(56) References Cited

U.S. PATENT DOCUMENTS

| | | | |
|---|---|---|---|
| 4,070,262 A | 1/1978 | Guarino et al. | |
| 4,071,425 A | 1/1978 | Guarino et al. | |
| 4,072,592 A | 2/1978 | Due et al. | |
| 4,072,770 A | 2/1978 | Ting | |
| 4,133,909 A | 1/1979 | Spencer | |
| 4,265,976 A | 5/1981 | Nowak | |
| 4,303,924 A | 12/1981 | Young, Jr. | |
| 4,978,969 A | 12/1990 | Chieng | |
| 5,162,389 A | 11/1992 | Lee et al. | |
| 5,219,641 A | 6/1993 | Mehta et al. | |
| 5,232,812 A | 8/1993 | Morrison et al. | |
| 5,270,368 A | 12/1993 | Lent et al. | |
| 5,623,001 A | 4/1997 | Figov | |
| 5,800,884 A | 9/1998 | D'Anna et al. | |
| 6,174,937 B1 | 1/2001 | Banning et al. | |
| 6,303,185 B1 * | 10/2001 | Banning et al. | 427/265 |
| 6,362,377 B1 * | 3/2002 | Young et al. | 568/579 |
| 6,486,903 B1 * | 11/2002 | Wagner et al. | 347/212 |
| 2003/0225178 A1 * | 12/2003 | Purvis | 522/67 |

* cited by examiner

*Primary Examiner*—Manish S Shah
(74) *Attorney, Agent, or Firm*—Oliff & Berridge, PLC

(57) ABSTRACT

An ink jettable overprint composition includes at least one of a polymerizable monomer and/or a polymerizable oligomer; at least one photoinitiator; and at least one wax.

21 Claims, No Drawings

CURABLE OVERCOAT FOR WAX-BASED INKS

BACKGROUND

The present disclosure relates to improved overcoat compositions and layers for application to images formed with wax-based inks or toners. More particularly, the present disclosure relates to improved overcoat compositions and layers containing waxes, which provide improved scratch and rub resistance to images formed with wax-based inks or toners.

Wax based inks, sometimes known as phase change inks, are used to form digital images on paper using heated piezoelectric or acoustic inkjet heads. The ejection of an ink drop by the print heads is electronically controlled. In embodiments, the hot drop partially cools upon hitting an intermediate surface, often an aluminum drum. The complete image is assembled on the intermediate surface and then transferred to paper and fixed thereon with a combination of pressure and heat resulting in a solid ink, or waxed-based ink print.

In conventional xerography, electrostatic latent images are formed on a xerographic surface by uniformly charging a charge retentive surface, such as a photoreceptor. The charged area is then selectively dissipated in a pattern of activating radiation corresponding to the original image. The latent charge pattern remaining on the surface corresponds to the area not exposed by radiation. Next, the latent charge pattern is visualized by passing the photoreceptor past one or more developer housings comprising toner, which adheres to the charge pattern by electrostatic attraction. The developed image is then fixed to the imaging surface or is transferred to a receiving substrate, such as paper, to which it is fixed by a suitable fusing technique, resulting in a xerographic print or toner-based print. To enable successful fusing with complete retention of the image on paper, in other words without offset of the image onto the fuser role, release enabling additives are incorporated in the process. Conventionally this has been a silicone oil based fuser oil, more recently in some printer designs the complexity of handling to fuser oil has been eliminated. This has been accomplished by incorporating wax in the toner particle. In both cases the fused image is left with a surface layer of either silicone oil or wax. Both surfaces can be difficult to subsequently coat.

Known methods of protecting toner-based images include applying an overcoat coating to the substrate. The overprint coating, often referred to as an overprint varnish or composition, is typically a liquid film coating that may be dried and/or cured. Curing may be accomplished through drying or heating or by applying ultraviolet light or low voltage electron beams to polymerize (crosslink) the components of the overcoat. However, known overprint coatings, such as those described in U.S. Pat. Nos. 4,070,262, 4,071,425, 4,072,592, 4,072,770, 4,133,909, 5,162,389, 5,800,884, 4,265,976, and 5,219,641, for example, fail to adequately protect toner-based prints and do not possess the requisite properties for controlled application, such as, for example, by an ink jet printer.

Typically, known coating formulations are applied using a liquid film coating device, and thus are often applied over the entire surface of the image, i.e., flood coating. Applying a composition to part of an image, i.e., spot coating, is possible, but it requires preparing a plate or cylinder prior to application of the overprint composition. Thus, applying known coating formulations can be inefficient, difficult, and time-consuming and is not desirable for integration with variable-data digital printing.

Coating formulations for ink-based images are also known. For example, UV curable ink-jet inks have been used in an attempt to overcome the failure of ink jet-generated images to withstand heat and sunlight. Typically, such UV curable ink-jet inks include polymerizable monomers, oligomers, or a mixture thereof along with a dye or pigment for color. However, these ink-jet inks often contain relatively large amounts of toxic solvent or water, as described in U.S. Pat. Nos. 4,978,969 and 5,623,001, respectively, or other toxic components, such as the varnish described in U.S. Pat. No. 5,270,368, or require specific, impractical conditions, such as, the varnish described in U.S. Pat. No. 4,303,924.

Although these various coating compositions are known, a problem still exists in their use with wax-based inks. For example, known overcoat compositions are generally incompatible with conventional wax-based inks. As a result, the known overcoat compositions do not provide a high quality overcoat over the conventional wax-based inks, and thus do not provide the desired increased scratch and rub resistance.

Accordingly, a need exists for an ink jettable protective composition that provides overprint coating properties including, but not limited to, thermal and light stability, scratch resistance, and smear (or rub) resistance to toner-based images and ink-based images, particularly in commercial print applications. More specifically, a need exists for an overprint coating that has a low viscosity (to enable ink jetting), yet is stable at the generally high temperature required for ink jetting and achieves the desired properties, including, but not limited to, the ability to wet over waxy surfaces from either solid ink jet prints or the waxy surfaces of toner fused in the absence of silicone oil, permit overwriting, reduce or prevent thermal cracking in response to thermal expansion of the toner, and protect an image from sun, heat, etc.

SUMMARY

The compositions and processes of the present disclosure, wherein a toner-based or ink-based image and/or substrate thereof is coated with an ink jettable, radiation curable overprint composition including a wax, variously satisfy these and other needs.

The present disclosure is directed to compositions and methods for protecting images by providing, for example, improved quality and durability, a high degree of scratch and smear or rub resistance, and thermal and light stability. Such images can be generated by forming an ink-based image or toner-based image on a substrate and treating the image with an ink jettable, radiation curable wax-containing overprint composition comprising at least one polymerizable monomer and/or oligomer, at least one photoinitiator, and at least one wax. The protected image is more permanent and durable, able to resist cracking and fading, and is capable of accepting overwriting in the absence of smearing.

The present disclosure further provides image processing methods comprising: generating an ink-based or toner-based image on a substrate; depositing an overprint composition onto the substrate as a whole, onto the image as a whole, or onto part(s) of the substrate and/or image; and curing the overprint composition. Thus, in embodiments of the present disclosure, the overprint composition can be deposited to completely cover the substrate or image thereon or selectively deposited to cover the image, part(s) of the image, part(s) of the substrate, and/or any combination thereof.

The composition can be applied to the substrate in a digital fashion and is suitable for in-line applications when combined with ink jet and/or xerographic techniques. When coated onto solid ink jet and/or xerographic prints, the overprint compositions have the additional advantage of reducing or eliminating document offset at temperatures up to about 70-100° C., reducing or eliminating the occurrence of solid ink or toner cracking, reducing or eliminating mass dependent differential gloss between ink or toner pile heights on color images, and increasing overall gloss at any given ink or toner pile height of the image. Overall appearance of the print is improved by the composition due to the composition's ability to fill in the roughness of the substrate and ink or toner, thereby forming a level film, which enhances glossiness. The combination of ink jet technology and xerography is described in, for example, U.S. Pat. No. 5,232,812, which is incorporated herein by reference in its entirety.

The disclosure further provides to toner-based and ink-based prints comprising an ultraviolet (UV) curable overprint composition applied to at least one surface of the print, preferably, applied to the top of the substrate and/or the fused-toner image. The UV curable composition comprises a homogeneous mixture of polymerizable monomers and/or oligomers, photoinitiators, and waxes. By coating a print with the disclosed composition, the toner or ink is effectively buried beneath an overcoat, which essentially forms a protective barrier on the print.

In particular, the present disclosure provides an ink jettable overprint composition, comprising:\
at least one of a polymerizable monomer and/or a polymerizable oligomer;
at least one photoinitiator; and
at least one wax.

DETAILED DESCRIPTION OF PREFERRED EMBODIMENTS

The present invention provides ink jettable, image protecting compositions comprising radiation curable overprint compositions especially adapted for ink jet printers, and particularly adapted for overcoating wax-based images such as images created using wax-based inks or wax-based toners. The compositions comprise at least one radiation curable monomer and/or oligomer, at least one photoinitiator, and at least one wax.

In the uncured state, the composition is preferably a low viscous liquid and is readily jettable. Upon exposure to a suitable source of curing energy, e.g., ultraviolet light, electron beam energy, etc., the photoinitiator absorbs the energy and sets into motion a reaction that converts the liquid composition into a cured protective overcoat. The monomer and/or oligomer in the composition contain functional groups that polymerize during exposure to the curing source to readily crosslink forming a polymer network. This polymer network provides printed images with, for example, durability, thermal and light stability, and scratch and smear resistance. Thus, the composition is particularly well-suited for coating ink-based images and toner-based images on substrates subjected to heat and sunlight since the composition protects the image from cracking and fading, provides image permanence, and allows for overwriting in the absence of smearing and beading. The composition also includes a wax and, thus, the composition is further particularly well-suited for coating wax-based ink-based images and wax-based toner-based images.

Overprint Compositions

The overprint compositions comprise, in general, at least one radiation curable oligomer and/or monomer, at least one photoinitiator, and at least one wax. More specifically, the overprint compositions comprise at least one polymerizable oligomer and/or monomer, at least one UV-photoinitiator used to initiate the photopolymerization, i.e., curing, of the chemically unsaturated prepolymer (oligomer and/or monomer); and at least one wax.

Suitable UV curable oligomers include, but are not limited to, acrylated polyesters, acrylated polyethers, acrylated epoxies, and urethane acrylates. Specific examples of suitable acrylated oligomers include, but are not limited to, acrylated polyester oligomers, such as EB 81 (UCB Chemicals), CN2200 (Sartomer Co.), CN2300 (Sartomer Co.), and the like, acrylated urethane oligomers, such as EB270 (UCB Chemicals), EB 5129 (UCB Chemicals), CN2920 (Sartomer Co.), CN3211 (Sartomer Co.), and the like, and acrylated epoxy oligomers, such as EB 600 (UCB Chemicals), EB 3411 (UCB Chemicals), CN2204 (Sartomer Co.), CN110 (Sartomer Co.), and the like. Specific examples of suitable acrylated monomers include, but are not limited to, polyacrylates, such as trimethylol propane triacrylate, pentaerythritol tetraacrylate, pentaerythritol triacrylate, dipentaerythritol pentaacrylate, glycerol propoxy triacrylate, tris(2-hydroxyethyl) isocyanurate triacrylate, pentaacrylate ester, and the like, epoxy acrylates, urethane acrylates, amine acrylates, acrylic acrylates, and the like. Mixtures of two or more materials can also be employed as the reactive monomer. Suitable reactive monomers are commercially available from, for example, Sartomer Co., Inc., Henkel Corp., Radcure Specialties, and the like.

In embodiments, the at least one radiation curable oligomer and/or monomer can be cationically curable, radically curable, or the like.

The monomer functions as a viscosity reducer, as a binder when the composition is cured, as an adhesion promoter, and as a crosslinking agent, for example. Suitable monomers have a low molecular weight, low viscosity, and low surface tension and comprise functional groups that undergo polymerization upon exposure to UV light. The monomers are preferably monoacrylates, diacrylates, or polyfunctional alkoxylated or polyalkoxylated acrylic monomers comprising one or more di- or tri-acrylates. Suitable monoacrylates are, for example, cyclohexyl acrylate, 2-ethoxy ethyl acrylate, 2-methoxy ethyl acrylate, 2(2-ethoxyethoxy)ethyl acrylate, stearyl acrylate, tetrahydrofurfuryl acrylate, octyl acrylate, lauryl acrylate, behenyl acrylate, 2-phenoxy ethyl acrylate, tertiary butyl acrylate, glycidyl acrylate, isodecyl acrylate, benzyl acrylate, hexyl acrylate, isooctyl acrylate, isobornyl acrylate, butanediol monoacrylate, ethoxylated phenol monoacrylate, oxyethylated phenol acrylate, monomethoxy hexanediol acrylate, beta-carboxy ethyl acrylate, dicyclopentyl acrylate, carbonyl acrylate, octyl decyl acrylate, ethoxylated nonylphenol acrylate, hydroxyethyl acrylate, hydroxyethyl methacrylate, and the like. Suitable polyfunctional alkoxylated or polyalkoxylated acrylates are, for example, alkoxylated, preferably, ethoxylated, or propoxylated, variants of the following: neopentyl glycol diacrylates, butanediol diacrylates, trimethylolpropane triacrylates, glyceryl triacrylates, 1,3-butylene glycol diacrylate, 1,4-butanediol diacrylate, diethylene glycol diacrylate, 1,6-hexanediol diacrylate, tetraethylene glycol diacrylate, triethylene glycol diacrylate, tripropylene glycol diacrylate, polybutanediol diacrylate, polyethylene glycol diacrylate, propoxylated neopentyl glycol diacrylate, ethoxylated neopentyl glycol diacrylate, polybutadiene diacrylate, and the like. In the most preferred embodiment, the monomer is a propoxylated neopentyl glycol diacrylate, such as, for example, SR-9003 (Sartomer Co., Inc., Exton, Pa.), having the structure:

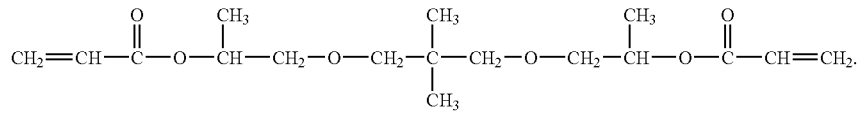

Suitable reactive monomers are likewise commercially available from, for example, Sartomer Co., Inc., Henkel Corp., Radcure Specialties, and the like.

In embodiments, the overcoat composition preferably includes at least one reactive monomer and/or oligomer. However, other embodiments can include only one or more reactive oligomers, only one or more reactive monomers, or a combination of one or more reactive oligomers and one or more reactive monomers.

Suitable photoinitiators are UV-photoinitiators including, but not limited to, hydroxycyclohexylphenyl ketones; other ketones such as alpha-amino ketone and 4-(2-hydroxyethoxy)phenyl-(2-hydroxy-2-propyl)ketone; benzoins; benzoin alkyl ethers; benzophenones, such as 2,4,6-trimethylbenzophenone and 4-methylbenzophenone; trimethylbenzoylphenylphosphine oxides such as 2,4,6-trimethylbenzoyl-diphenyl-phosphine oxide; azo compounds; anthraquinones and substituted anthraquinones, such as, for example, alkyl substituted or halo substituted anthraquinones; other substituted or unsubstituted polynuclear quinines; acetophenones, thioxanthones; ketals; acylphosphines; and mixtures thereof. Other examples of photoinitiators include, but not limited to, 2-hydroxy-2-methyl-1-phenyl-propan-1-one and 2-isopropyl-9H-thioxanthen-9-one. More preferably, the photoinitiator is one of the following compounds or a mixture thereof: a hydroxycyclohexylphenyl ketone, such as, for example, 1-hydroxycyclohexylphenyl ketone, such as, for example, Irgacure® 184 (Ciba-Geigy Corp., Tarrytown, N.Y.), having the structure:

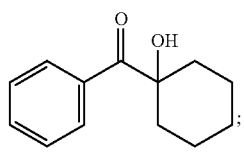

a trimethylbenzoylphenylphosphine oxide, such as, for example, ethyl-2,4,6-trimethylbenzoylphenylphosphinate, such as, for example, Lucirin® TPO-L (BASF Corp.), having the formula

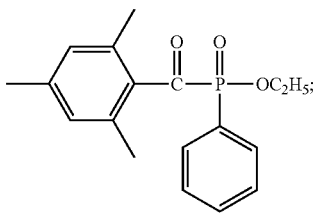

a mixture of 2,4,6-trimethylbenzophenone and 4-methylbenzophenone, such as, for example, SARCURE™ SR1137 (Sartomer); a mixture of 2,4,6-trimethylbenzoyl-diphenyl-phosphine oxide and 2-hydroxy-2-methyl-1-phenyl-propan-1-one, such as, for example, DAROCUR® (4265 (Ciba Specialty Chemicals); alpha-amino ketone, such as, for example, IRGACURE® 379 (Ciba Specialty Chemicals); 4-(2-hydroxyethoxy)phenyl-(2-hydroxy-2-propyl) ketone, such as, for example, IRGACURE® 2959 (Ciba Specialty Chemicals); 2-isopropyl-9H-thioxanthen-9-one, such as, for example, DAROCUR® ITX (Ciba Specialty Chemicals); and mixtures thereof.

Surfactants may also optionally be used to lower the surface tension of the composition to allow wetting and leveling of the substrate surface, if necessary, before curing. Any surfactant that has this capability may be used. However, in embodiments, the surfactant is not required, and need not be included. When present, preferred surfactants include, but are not limited to, fluorinated alkyl esters, polyether modified polydimethylsiloxanes, having the structure:

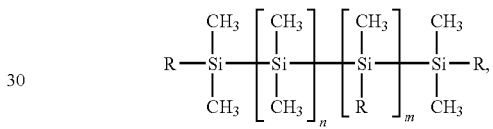

wherein the R groups are functional modifications, such as, for example, BYK®-UV3510 (BYK Chemie GmbH, Wesel, Germany), and BYK®-348 (BYK Chemie GmbH), and fluorosurfactants, such as, for example, Zonyl® FSO-100 (E.I. Du Pont de Nemours and Co., Wilmington, Del.), having the formula $RfCH_2CH_2O(CH_2CH_2O)xH$, wherein $Rf=F(CF_2CF_2)y$, $x=0$ to about 15, and $y=1$ to about 7.

Additionally, the ink may contain a component that lowers the coefficient of friction. Preferred compounds include, but are not limited to, polyethylene waxes, such as POLYWAX655™, POLYWAX 850™, POLYWAX 1000™ and POLYWAX 2000™ and the like, available from Baker-Petrolite (reference U.S. Pat. No. 6,174,937, the entire disclosure of which is incorporated herein by reference); EB4842, an aliphatic urethane diacrylate containing migratory silicone available from UCB Chemicals; CN 990, a siliconized urethane acrylate oligomer, such as that available from Sartomer Company, Inc.; and mixtures thereof.

The overcoat composition also includes one or more waxes. The wax is present to increase the affinity of the overcoat with the underlying printed image, and may or may not participate in the UV light-induced polymerization reaction. Suitable examples of waxes include, but are not limited to, those that are functionalized with UV curable groups. These waxes can be synthesized by the reaction of a wax equipped with a transformable functional group, such as carboxylic acid or hydroxyl. Suitable examples of carboxylic acid-terminated polyethylene waxes include, but are not limited to, mixtures of carbon chains with the structure $CH_3$—$(CH_2)_n$—COOH, where there is a mixture of chain lengths, n, where the average chain length is preferably in the range of about 16 to about 50, and linear low molecular weight polyethylene, of similar average chain length. Suitable examples of such waxes include, but are not limited to, UNICID® 350, UNICID® 425, UNICID® 550 and UNICID® 700 with $M_n$ equal to approximately 390, 475, 565 and 720 g/mol, respectively. Other suitable waxes have a structure $CH_3$—$(CH_2)_n$—COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. These carboxylic acids can be reacted with alcohols equipped with UV curable moieties to form reactive esters. Examples of these alcohols include, but are not limited to, 2-allyloxyethanol from Sigma-Aldrich Co.;

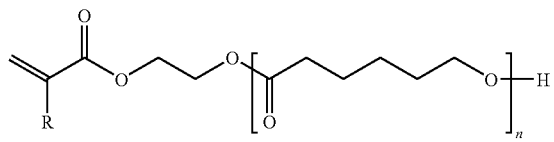

TONE M-101 (R=H, $n_{avg}$=1), TONE M-100 (R=H, $n_{avg}$=2) and TONE M-201 (R=Me, $n_{avg}$=1) from The Dow Chemical Company; and

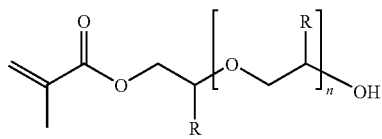

CD570 (R=H, n=2), CD571 (R=H, n=5), CD572 (R=H, n=10) and SR604 (R=Me, n=4) from Sartomer Company, Inc.

Suitable examples of hydroxyl-terminated polyethylene waxes include, but are not limited to, mixtures of carbon chains with the structure $CH_3$—$(CH_2)_n$—$CH_2OH$, where there is a mixture of chain lengths, n, where the average chain length is preferably in the range of about 16 to about 50, and linear low molecular weight polyethylene, of similar average chain length. Suitable examples of such waxes include, but are not limited to, UNILIN® 350, UNILIN® 425, UNILIN® 550 and UNILIN® 700 with $M_n$ approximately equal to 375, 460, 550 and 700 g/mol, respectively. All of these waxes are commercially available from Baker-Petrolite. These alcohols can be reacted with carboxylic acids equipped with UV curable moieties to form reactive esters. Examples of these acids include, but are not limited to, acrylic and methacrylic acids, available from Sigma-Aldrich Co.

Other suitable waxes include various crystalline polymeric waxes, where "crystalline polymeric waxes" refers to a wax material that contains an ordered array of polymer chains within a polymer matrix which can be characterized by a crystalline melting point transition temperature, Tm. The crystalline melting temperature is the melting temperature of the crystalline domains of a polymer sample. This is in contrast to the glass transition temperature, Tg which characterizes the temperature at which polymer chains begin to flow for the amphorous regions within a polymer. Preferred crystalline polymeric waxes that can be used as the wax include one or more materials selected from the group of aliphatic polar amide functionalized waxes, carboxylic acid-terminated polyethylene waxes, aliphatic waxes consisting of esters of hydroxylated unsaturated fatty acids, high acid waxes, and mixtures thereof. By "high acid waxes" it is meant a wax material that has a high acid content.

Suitable examples of crystalline aliphatic polar amide functionalized waxes include, but are not limited to, stearamides, lauramides, palmitamides, behenamides, oleamides, erucamides, recinoleamides, mixtures thereof, and the like. Specific examples of suitable crystalline aliphatic polar amide functionalized waxes include, but are not limited to, stearyl stearamide, behenyl behenamide, stearyl behenamide, behenyl stearamide, oleyl oleamide, oleyl stearamide, stearyl oleamide, stearyl erucamide, oleyl palmitamide; methylol amide such as methylol stearamide or methylol behenamide, mixtures thereof, and the like. For example, a particularly suitable crystalline aliphatic polar amide functionalized wax is the stearyl stearamide wax KEMAMIDE® S-180, available from Witco, USA. Other types of nitrogen containing functional group waxes suitable for use in the present invention include amines, imides and quaternary amines, such as those available as JONCRYL® waxes from Johnson Diversey Inc.

Suitable examples of carboxylic acid-terminated polyethylene waxes include, but are not limited to, mixtures of carbon chains with the structure $CH_3$—$(CH_2)_n$—COOH, where there is a mixture of chain lengths, n, where the average chain length is preferably in the range of about 16 to about 50, and linear low molecular weight polyethylene, of similar average chain length. Suitable examples of such waxes include, but are not limited to, UNICID® 550 with n approximately equal to 40, and UNICID® 700 with n approximately equal to 50. For example, a particularly suitable crystalline carboxylic acid-terminated polyethylene wax is UNICID® 550, available from Baker Petrolite, (USA). UNICID® 550 consists of 80% carboxylic acid functionality with the remainder a linear, low molecular weight polyethylene of a similar chain length, and an acid value of 72 mg KOH/g and melting point of about 101° C. Other suitable waxes have a structure $CH_3$—$(CH_2)_n$—COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33.

Suitable examples of crystalline aliphatic waxes consisting of esters of hydroxylated unsaturated fatty acids, are those having a carbon chain length of from about 8 or less to about 20 or more or about 30 or more. For the crystalline aliphatic waxes consisting of esters of hydroxylated unsaturated fatty acids, any suitable chain length can be employed, so long as the functionality remains present and effective. In one particular embodiment, for example, the crystalline aliphatic waxes consisting of esters of hydroxylated unsaturated fatty acids have a chain length of preferably from about 10 to about 16. Especially preferred in embodiments are those having a carbon chain length of approximately 12 units, such as from about 11 to about 13. Examples of such waxes include, but are not limited to, Carnauba wax and the like. For example, a particularly suitable crystalline aliphatic waxes consisting of esters of hydroxylated unsaturated fatty acids is RC-160 Carnauba wax, available from Toa Kasei, Japan.

Suitable examples of high acid waxes are acid waxes having a high acid content of, for example, greater than about 50% acid functionalized. Preferred high acid waxes are linear long chain aliphatic high acid waxes where a long chain is a chain with 16 or more $CH_2$ units. Linear, saturated, aliphatic waxes, preferably having an end-functionalized carboxylic acid, are particularly preferred. Also preferred are high acid waxes with acid content of greater than about 50 mg KOH/g. In embodiments, the high acid wax is preferably a montan wax, n-octacosanoic acid, $CH_3(CH_2)_{26}$—COOH, about 100% acid functionalized. Examples of such suitable montan waxes include, but are not limited to, Licowax® S and Licomont ER 165, manufactured by Clariant, GmbH (Germany) with an acid value of 127 to 160 mg KOH/g, Licowax® SW with acid value of 115-135, Licowax® UL with an acid value of 100-115 mg KOH/g and Licowax® X101 with acid value 130-150. Other suitable high acid include partly esterified montanic acid waxes, where some of the acid termination have been esterified, such as Licowax® with an acid value of 72-92 mg KOH/g.

Optional additives include, but are not limited to, light stabilizers, UV absorbers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, waxes, oils, plasticizers, binders, electrical conductive agents, organic and/or inorganic filler particles, leveling agents, e.g., agents that create or reduce different gloss levels, opacifiers, antistatic agents, dispersants, pigments and dyes, and the like. The composition can also include an inhibitor, preferably, a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating an overprint composition using optional additives.

The viscosity of the compositions ranges from about $10^7$ cP to about 2.0 cP, depending on the temperature. Preferably, the viscosity of the compositions is about 2.0 cP to 20 cP between 70 and 110° C.

The above components of the overcoat or overprint composition can be suitably mixed in any desired amount to provide a desired composition. However, the following proportions are provided for embodiments as general guidelines.

In a first embodiment, the composition contains from about 20 to about 95 wt % reactive monomer, from about 0 to about 30 wt % reactive oligomer, from about 0 to about 50 wt % of a component that reduces the coefficient of friction of the coating composition, from about 0.5 to about 15 wt % photoinitiator such as UV-photoinitiator, from about 0.05 to about 60 wt % wax, and optional additives such as from about 0.05 to about 5 wt % of an amine synergist. Preferably, in this embodiment, the composition contains from about 30 to about 90 wt %, more preferably from about 35 to about 85 wt %, reactive monomer; from about 0 to about 20 wt %, more preferably from about 0 to about 15 wt %, reactive oligomer; from about 0 to about 60 wt %, more preferably from about 0 to about 50 wt %, of a component that reduces the coefficient of friction of the coating composition; from about 1 to about 15 wt %, more preferably from about 3 to about 12 wt %, photoinitiator such as UV-photoinitiator; from about 0.1 to about 60 wt %, more preferably from about 0.5 to about 50 wt %, wax; and optional additives such as from about 0 to about 3 wt %, more preferably from about 0 to about 2 wt %, of an amine synergist. Of course, other amounts can be used as desired.

Overprint Composition Application Methods

The overprint compositions of the present invention can be used in image processing comprising: generating an ink-based or toner-based image on a substrate; ink jetting the overprint composition onto the substrate as a whole, onto the image as a whole, onto part(s) of the image, onto part(s) of the substrate, or any combination thereof; and curing the overprint composition.

When the composition is coated onto an image, parts thereof, substrate, and/or parts thereof, it can be applied at different levels of resolution. For example, the composition can be applied at the resolution of the print halftone dot, at the resolution of distinct part(s) of the image, or at a little less resolution than distinct part(s) of the image, allowing for some overlap of the composition onto nonimage areas of the substrate. The typical composition deposition level is in an amount of from about 5 to about 50 picolitres drop size. The composition can be applied in at least one pass over the image at any stage in the image formation using any known ink jet printing technique, such as, for example, drop-on-demand ink jet printing including, but not limited to, piezoelectric and acoustic ink jet printing. The application of the composition can be controlled with the same information used to form the image such that only one digital file is needed to produce the image and the overprint composition. Thus, the overprint composition is fully digital.

When coating a toner-based image, the fused toner-based print is obtained first and then subjected to an ink jet printer containing the jettable overprint composition. The toner-based print can be prepared by any suitable conventional xerographic technique or variant thereof.

Similarly, when coating an ink-based image, the ink-based image is generated first and then subjected to an ink jet printer containing the jettable overprint composition. If the ink-based image is formed using an ink jet printer, then the ink-based image can be subjected to a separate ink jet printer containing the jettable overprint composition or the ink jet ink can be housed in the same ink jet printer as the composition, whereby the composition is coated onto the substrate and/or image as a, preferably, colorless, transparent fluid after the ink jet ink image is formed. When the overprint composition is coated over an ink-based image, particularly, an image produced using an ink jet printer, the image can be prepared by any suitable conventional process or variant thereof.

Preferably, the toner-based or ink-based image is formed of a marking material (toner or ink) that is wax-based. That is, the toner or ink image preferably includes one or more waxes as a component that remains fixed on the substrate as part of the image. Such wax-based toner-based or ink-based images conventionally could not be effectively overcoated with an overcoat composition due to the presence of the wax, which was incompatible with conventional overcoat compositions. However, the present disclosure addresses this difficulty by incorporating the wax into the overcoat composition.

The substrate employed can be any appropriate substrate depending upon the end use of the print. Exemplary substrates include, but are not limited to, plain paper, coated paper, plastics, polymeric films, treated cellulosics, wood, xerographic substrates, and mixtures thereof, optionally comprising additives coated thereon. The optional additives include, but are not limited to, anti-curl compounds, such as, for example, trimethylolpropane; and mixtures thereof; and any other optional additives well known in the ink art or xerographic art for enhancing the performance and/or value of the ink, toner, and/or substrate.

The energy source used to initiate crosslinking of the radiation curable oligomer and/or monomer components of the composition can be actinic, e.g., radiation having a wavelength in the ultraviolet or visible region of the spectrum, accelerated particles, e.g., electron beam radiation, thermal, e.g., heat or infrared radiation, or the like. Preferably, the energy is actinic radiation because such energy provides excellent control over the initiation and rate of crosslinking. Suitable sources of actinic radiation include, but are not limited to, mercury lamps, xenon lamps, carbon arc lamps, tungsten filament lamps, lasers, sunlight, and the like.

Ultraviolet radiation, especially from a medium pressure mercury lamp with a high speed conveyor under UV light, e.g., about 20 to about 70 m/min., is preferred, wherein the UV radiation is provided at a wavelength of about 200 to about 500 nm for about less than one second. More preferably, the speed of the high speed conveyor is about 15 to about 35 m/min. under UV light at a wavelength of about 200 to about 450 nm for about 10 to about 50 milliseconds (ms). The emission spectrum of the UV light source generally overlaps the absorption spectrum of the UV-initiator. Optional curing equipment includes, but is not limited to, a reflector to focus or diffuse the UV light, and a cooling system to remove heat from the UV light source.

The disclosure will be illustrated further in the following nonlimiting Examples. The Examples are intended to be illustrative only. The invention is not intended to be limited to the materials, conditions, process parameters, and the like, recited herein. Parts and percentages are by weight unless otherwise indicated.

EXAMPLES

Comparative Example 1

An overprint composition is formed that includes reactive monomers and/or oligomers, but no wax. The composition includes the components and amounts as shown in the Table below.

A printed image is formed using a Xerox Phaser® 8400DP-1 printer, which uses wax-based inks. The coating composition is then overcoated over the printed image using a gravure plate K-Proofer at 85° C. using a 100% coverage amount, and then cured. The resultant coated print is tested for scratch and rub resistance and for wettability. The results show unacceptable scratch and rub resistance, as well as dewetting when viewed under a microscope.

Examples 1-3

Overprint compositions are formed by modifying the composition of Comparative Example 1 to include varying amounts of a wax. The compositions include the components and amounts as shown in the Table below.

As in Comparative Example 1, printed images are formed using a Xerox Phaser® 8400DP-1 printer, which uses wax-based inks. The coating compositions are then overcoated over the printed image using a gravure plate K-Proofer at 85° C. using a 100% coverage amount, and then cured. The resultant coated prints are tested for scratch and rub resistance and for wettability. The results show moderate improvement in scratch resistance and significant improvement in rub resistance over the Comparative Example. When viewed under a microscope, no dewetting is observed.

Examples 4-6

Overprint compositions are formed by modifying the composition of Comparative Example 1 to include varying amounts of a wax, and no reactive oligomer. The compositions include the components and amounts as shown in the Table below.

As in Comparative Example 1, printed images are formed using a Xerox Phaser® 8400DP-1 printer, which uses wax-based inks. The coating compositions are then overcoated over the printed image using a gravure plate K-Proofer at 85° C. using a 100% coverage amount, and then cured. The resultant coated prints are tested for scratch and rub resistance and for wettability. The results show moderate improvement in scratch resistance and significant improvement in rub resistance over the Comparative Example. When viewed under a microscope, no dewetting is observed.

| Example # | CX 1 | X 1 | X 2 | X 3 | X 4 | X 5 | X 6 |
|---|---|---|---|---|---|---|---|
| Reactive monomer 1 (SR9003) | 21 | 16 | 20 | 18.5 | 41.8 | 61.2 | |
| Reactive monomer 2 (SR833S) | 15 | 15 | 15 | 15 | | | |
| Reactive monomer 3 (SR454) | 8 | 8 | 8 | 8 | | | |
| Reactive monomer 4 (SR399) | 10 | 10 | 10 | 10 | | | |
| Reactive monomer 5 Bis[4-(vinyloxy)butyl] (trimethyl-1,6-hexanediyl) biscarbamate (mixture of 2,2,4- and 2,4,4-isomers) | | | | | | | 80 |
| Additive 1 (reduces coefficient of friction) (EB4842) | 40 | 40 | 40 | 40 | | | |
| Additive 2 (stabilizer) (Irgastab UV10) | | | | | 0.2 | 0.2 | |
| Additive 3 (amine synergist) (AS-3) | 1 | 1 | 1 | 1 | | | |
| Photoinitiator 1 (SR1137) | 3 | 3 | 3 | 3 | | | |
| Photoinitiator 2 (Darocur 4265) | 2 | 2 | 2 | 2 | | | |
| Photoinitiator 3 (Irgacure 379) | | | | | 3 | 3 | |
| Photoinitiator 4 (Irgacure 2959) | | | | | 3 | 3 | |
| Photoinitiator 5 (ITX) | | | | | 2 | 2 | |
| Photoinitiator 6 (R-gen® BF-1172) | | | | | | | 10 |
| Wax 1 (Unilin 350-acrylate) | | 5 | 1 | 2.5 | 50 | | |
| Wax 2 (Licomont ER 165) | | | | | | 30.6 | |
| Wax 3 (Unilin 350) | | | | | | | 10 |

Notes:
1) SR9003 is a propoxylated neopentyl glycol diacrylate (obtained from Sartomer Company, Inc.).
2) SR833S is a tricyclodecane dimethanol diacrylate (obtained from Sartomer Company, Inc.).
3) SR454 is a triacrylate monomer (obtained from Sartomer Company, Inc.).
4) SR399 is a dipentaerythritol pentaacrylate ester (obtained from Sartomer Company, Inc.).

-continued

| Example # | CX1 | X1 | X2 | X3 | X4 | X5 | X6 |
|---|---|---|---|---|---|---|---|

5) Bis[4-(vinyloxy)butyl](trimethyl-1,6-hexanediyl)biscarbarmate (mixture of 2,2,4- and 2,4,4-isomers) was prepared as follows: To a 2 L three neck flask equipped with a stopper, dropping funnel, stir bar and reflux condenser was added trimethyl-1,6- diisocyanatohexane (mixture of 2,2,4- and 2,4,4-isomers, 118.7 g, 0.57 mol, obtained from Sigma-Aldrich, Milwaukee, WI), dibutyltin dilaurate (3.56 g, 5.6 mmol, obtained from Sigma-Aldrich, Milwaukee, WI) and anhydrous tetrahydrofuran (1 L). 1,4-Butanediol vinyl ether (133.2 g, 1.2 mol, obtained from Sigma-Aldrich, Milwaukee, WI) was added slowly dropwise to the stirring solution via the addition funnel. The reaction mixture was brought to reflux and was kept at this temperature until deemed complete by infrared spectroscopy (usually 5 h, confirmed by the disappearance of the isocyanate peak at 2200 $cm^{-1}$). When the reaction was complete, methanol (500 mL) was added to quench any residual isocyanate and the solution was stirred for 0.5 h. The solvent was stripped in vacuo and the residual oil was triturated with hexane (3 × 500 mL), dissolved in methylene chloride (1 L), washed with water (1 × 750 mL), dried over anhydrous magnesium sulfate, filtered and concentrated in vacuo to afford 221 g of a pale yellow oil (89% yield).
6) EB4842 is an aliphatic urethane diacrylate containing silicone (obtained from UCB Chemicals).
7) Irgastab UV10 is a radical scavenger (obtained from Ciba Specialty Chemicals).
8) AS-3 is an aliphatic amine synergist (obtained from FIRSTCURE).
9) SR1137 is a mixture of 2,4,6-trimethylbenzophenone and 4-methylbenzophenone (obtained from Sartomer Company Inc.).
10) Darocur 4265 is a mixture of 2,4,6-trimethylbenzoyl-diphenyl-phosphine oxide and 2-hydroxy-2-methyl-1-phenyl-propan-1-one (obtained from Ciba Specialty Chemicals).
11) Irgacure 379 is an alpha-amino ketone (obtained from Ciba Specialty Chemicals).
12) Irgacure 2959 is 4-(2-hydroxyethoxy)phenyl-(2-hydroxy-2-propyl) ketone (obtained from Ciba Specialty Chemicals).
13) ITX is 2-isopropyl-9H-thioxanthen-9-one (obtained from Ciba Specialty Chemicals).
14) R-gen12 ® BF-1172 is a 40% propylene carbonate solution of substituted triarylsulfonium hexafluorophosphate salts obtained from Chitec Chemical Co., Ltd., Taiwan, R.O.C.
15) Unilin 350-acrylate is an acrylate-modified wax based on Unilin 350. To a 2 L three neck flask equipped with a reflux condenser, dropping funnel, thermometer, and Dean-Stark trap was added Unilin 350 (about 80% hydroxyl-terminated polyethylene wax consisting of carbon chains with the structure $CH_3$—$(CH_2)_n$—$CH_2OH$, where there is a mixture of chain lengths, n, where the average chain length is preferably in the range of about 24 to about 26 and about 20% linear low molecular weight polyethylene of similar average chain length; 200 g, hydroxyl number 128.40 mg KOH/g, 79 wt %, obtained from Baker Petrolite, Tulsa, Oklahoma), p-toluene sulfonic acid (1.96 g, 0.8 wt %, obtained from Sigma-Aldrich Co., Milwaukee, Wisconsin), hydroquinone (0.25 g, 0.1 wt %, obtained from Sigma-Aldrich Co., Milwaukee, Wisconsin) and toluene (600 mL). The reaction mixture was heated until dissolved. Acrylic acid (48 mL, 20 wt %) was added slowly by the addition funnel. The reaction was allowed to reflux until water ceased collecting in the Dean-Stark trap, and was deemed complete by $^1$H-NMR spectroscopy. At the end of the reaction, the mixture was cooled to room temperature and filtered. The solid was triturated with methanol, filtered, and dried in a vacuum oven. The toluene filtrate was concentrated in vacuo, triturated with cold methanol, filtered, and dried in a vacuum oven.
16) Licomont ER 165 is a UV curable montan wax (obtained from Clariant).
17) Unilin 350 is comprised of about 80% hydroxyl-terminated polyethylene wax consisting of carbon chains with the structure $CH_3$—$(CH_2)_n$—$CH_2OH$, where there is a mixture of chain lengths, n, where the average chain length is preferably in the range of about 24 to about 26 and about 20% linear low molecular weight polyethylene of similar average chain length.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:
1. An ink jettable overprint composition, comprising:
at least one of a polymerizable monomer and/or a polymerizable oligomer;
at least one photoinitiator; and
from about 30.6 wt % to about 60 wt % of at least one wax selected from the group consisting of waxes functionalized with UV curable groups, crystalline polymeric waxes, and hydroxyl-terminated polyethylene waxes,
wherein the waxes functionalized with UV curable groups are selected from the group consisting of esterified carboxylic acid-terminated polyethylene waxes functionalized with UV curable groups and esterified hydroxyl-terminated polyethylene waxes functionalized with UV curable groups; and
the crystalline polymeric waxes are selected from the group consisting of aliphatic polar amide functionalized waxes, carboxylic acid-terminated polyethylene waxes, aliphatic waxes consisting of esters of hydroxylated unsaturated fatty acids, high acid waxes, and mixtures thereof.
2. The composition of claim 1, wherein the overprint composition has a viscosity ranging from about 2 cP to about 20 cP at a temperature ranging from about 70° C. to about 110° C.
3. The composition of claim 1, wherein the wax increases an affinity of the overprint composition with an underlying printed image.
4. The composition of claim 1, wherein the overprint composition comprises at least one polymerizable monomer and at least one polymerizable oligomer.
5. The composition of claim 1, wherein the overprint composition comprises:
from about 20 to about 95 wt % of a polymerizable monomer;
from about 0 to about 30 wt % polymerizable oligomer; and
from about 0.5 to about 15 wt % of photoinitiator.
6. The composition of claim 1, wherein the overprint composition comprises:
from about 30 to about 90 wt % of a polymerizable monomer;
from about 0 to about 20 wt % polymerizable oligomer; and
from about 1 to about 15 wt % of photoinitiator.
7. The composition of claim 1, further comprising a component that reduces a coefficient of friction of the overprint composition.
8. The composition of claim 1, wherein the monomer is cationically curable.
9. The composition of claim 1, wherein the monomer is radically curable.
10. The composition of claim 1, further comprising an amine synergist.
11. The composition of claim 1, wherein the photoinitiator is selected from the group consisting of triarylsulfonium salts, diaryliodonium salts, aryldiazonium salts, triarylselenonium salts, dialkylphenacylsulphonium salts, triarylsulphoxonium salts, aryloxydiarylsulphonoxonium salts, and dialkylphenacylsulphoxonium salts, wherein the salts are formed with ions selected from the group consisting of $BF_4^-$, $PF_6^-$, $AsF_6^-$, $SbF_6^-$.
12. The composition of claim 1, wherein the photoinitiator is selected from the group consisting of hydroxycyclohexylphenyl ketones, trimethylbenzophenones, polymeric hydroxy ketones, trimethylbenzoylphenylphosphine oxides, and mixtures thereof.
13. The composition of claim 1, wherein the photoinitiator is selected from the group consisting of 2,4,6-trimethylbenzophenone, 4-methylbenzophenone, 2,4,6-trimethylbenzoyl-diphenyl-phosphine oxide, 2-hydroxy-2-methyl- 1-phenyl-propan- 1-one, alpha-amino ketone, 4-(2-hydroxyethoxy)

phenyl-(2-hydroxy-2-propyl) ketone, 2-isopropyl-9H-thioxanthen-9-one, and mixtures thereof.

14. The composition of claim 1, wherein the polymerizable monomer is present and is selected from the group consisting of neopentyl glycol diacrylates, butanediol diacrylates, trimethyloipropane triacrylates, and glyceryl triacrylates.

15. A method of ink jet printing, comprising:
providing an ink jettable overprint composition according to claim 1;
ink jetting the overprint composition onto a substrate having an image thereon; and
exposing the image to a radiation source for sufficient time to at least substantially cure the radiation curable components of the overprint composition.

16. The method of claim 15, wherein the image is wax-based.

17. The method of claim 15, wherein the image is ink-based.

18. The method of claim 15, wherein the radiation source is an ultraviolet light.

19. The method of claim 15, wherein the ink jet is a thermal ink jet printer or a piezoelectric ink jet printer.

20. A toner-based or ink-based print, comprising a substrate with a toner-based or ink-based image thereon coated with the overprint composition of claim 1, wherein, upon curing, the toner or ink on the print resists smearing upon overwriting.

21. A system for creating an image on a substrate, comprising:
an image generating component;
a substrate for receiving an image generated from the image generating component; and
an overprint composition configured for being ink jetted onto the generated image;
wherein the overprint composition comprises:
at least one of a polymerizable monomer and a polymerizable oligomer;
at least one photoinitiator; and
from about 30.6 wt % to about 60 wt % of at least one wax selected from the group consisting of waxes functionalized with UV curable groups, crystalline polymeric waxes, and hydroxyl-terminated polyethylene waxes,
wherein the waxes functionalized with UV curable groups are selected from the group consisting of esterified carboxylic acid-terminated polyethylene waxes functionalized with UV curable groups and esterified hydroxyl-terminated polyethylene waxes functionalized with UV curable groups; and
the crystalline polymeric waxes are selected from the group consisting of aliphatic polar amide functionalized waxes. carboxylic acid-terminated polyethylene waxes, aliphatic waxes consisting of esters of hydroxylated unsaturated fatty acids, high acid waxes, and mixtures thereof.

* * * * *